US012124468B1

(12) United States Patent
 Zhou

(10) Patent No.: US 12,124,468 B1
(45) Date of Patent: Oct. 22, 2024

(54) GENERATIVE GRAPHICAL EXPLANATIONS USING LARGE LANGUAGE MODELS IN AI-BASED SERVICES

(71) Applicant: SAP SE, Walldorf (DE)

(72) Inventor: Yi Quan Zhou, Singapore (SG)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/454,905

(22) Filed: Aug. 24, 2023

(51) Int. Cl.
*G06F 16/245* (2019.01)
*G06F 9/54* (2006.01)
*G06F 16/2453* (2019.01)
*G06F 16/2455* (2019.01)
*G06F 16/248* (2019.01)

(52) U.S. Cl.
CPC ............ *G06F 16/248* (2019.01); *G06F 9/547* (2013.01); *G06F 16/24542* (2019.01); *G06F 16/2455* (2019.01)

(58) Field of Classification Search
None
See application file for complete search history.

(56) References Cited

U.S. PATENT DOCUMENTS

| | | | |
|---|---|---|---|
| 2015/0095840 A1* | 4/2015 | Soshin | G06F 16/93 |
| 2022/0270721 A1* | 8/2022 | Schrempf | G06F 16/245 |
| 2024/0070394 A1* | 2/2024 | Peng | G06F 16/25 |
| 2024/0086648 A1* | 3/2024 | Han | G06F 16/95 |
| 2024/0095077 A1* | 3/2024 | Singh | G06F 16/245 |
| 2024/0144346 A1* | 5/2024 | Alkan | G06F 16/248 |
| 2024/0146563 A1* | 5/2024 | Sheth | G06F 16/248 |
| 2024/0249080 A1* | 7/2024 | Sun | G06F 16/3344 |

OTHER PUBLICATIONS

U.S. Appl. No. 18/358,225, Arumugam et al., Large Language Models for Extracting Conversational-Style Explanations for Entity Matches, filed Jul. 25, 2023, 34 pages.

\* cited by examiner

*Primary Examiner* — Son T Hoang
(74) *Attorney, Agent, or Firm* — Fish & Richardson P.C.

(57) ABSTRACT

Methods, systems, and computer-readable storage media for receiving a query from a digital assistant of an enterprise system, retrieving data that is responsive to the query from a data management system, inputting a first few-shot prompt to a LLM, and determining, in response to the first few-shot prompt, that a graphical representation of the data is to be generated, and in response: inputting a second few-shot prompt and a third few-shot prompt to the LLM, receiving code from the LLM responsive to the third few-shot prompt, and executing the code to render the graphical representation with the digital assistant.

20 Claims, 5 Drawing Sheets

US 12,124,468 B1

GENERATIVE GRAPHICAL EXPLANATIONS USING LARGE LANGUAGE MODELS IN AI-BASED SERVICES

BACKGROUND

Enterprises continuously seek to improve and gain efficiencies in their operations. To this end, enterprises employ software systems to support execution of operations. Recently, enterprises have embarked on the journey of so-called intelligent enterprise, which includes automating tasks executed in support of enterprise operations using machine learning (ML) systems. For example, one or more ML models are each trained to perform some task based on training data. Trained ML models are deployed, each receiving input (e.g., a computer-readable document) and providing output (e.g., classification of the computer-readable document) in execution of a task (e.g., document classification task). ML systems can be used in a variety of problem spaces. For example, ML systems can be used for data analytics to process data representative of enterprise operations and present insights to users.

SUMMARY

Implementations of the present disclosure are directed to a digital assistant system that leverages large language models (LLMs) for the presentation and delivery of explanations in enterprise systems including graphical representations of data. More particularly, implementations of the present disclosure are directed to a digital assistant system that enables LLM-generated text to be generated based on enterprise data and presented to users within graphical user interface (GUIs) within digital assistants. In this manner, user-friendly and intuitive explanations of the data can be provided in hand with graphical representations of the data.

In some implementations, actions include receiving a query from a digital assistant of an enterprise system, retrieving data that is responsive to the query from a data management system, inputting a first few-shot prompt to a LLM, and determining, in response to the first few-shot prompt, that a graphical representation of the data is to be generated, and in response: inputting a second few-shot prompt and a third few-shot prompt to the LLM, receiving code from the LLM responsive to the third few-shot prompt, and executing the code to render the graphical representation with the digital assistant. Other implementations of this aspect include corresponding systems, apparatus, and computer programs, configured to perform the actions of the methods, encoded on computer storage devices.

These and other implementations can each optionally include one or more of the following features: the graphical representation is rendered within a popover container; the digital assistant communicates with the popover container using remote procedure calls (RPCs) to execute the code and render the graphical representation; actions further include displaying explanatory text within the digital assistant, the explanatory text being provided from the LLM in response to the second few-shot prompt and providing an explanation for the data and is responsive to the query; determining, in response to the first few-shot prompt, that a graphical representation of the data is to be generated includes generating a response by the LLM responsive to the first few-shot prompt, the response indicating that a graphical representation of the data is to be generated; the digital assistant is provided in an application; and the data management service is agnostic to multiple applications executing digital assistants.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
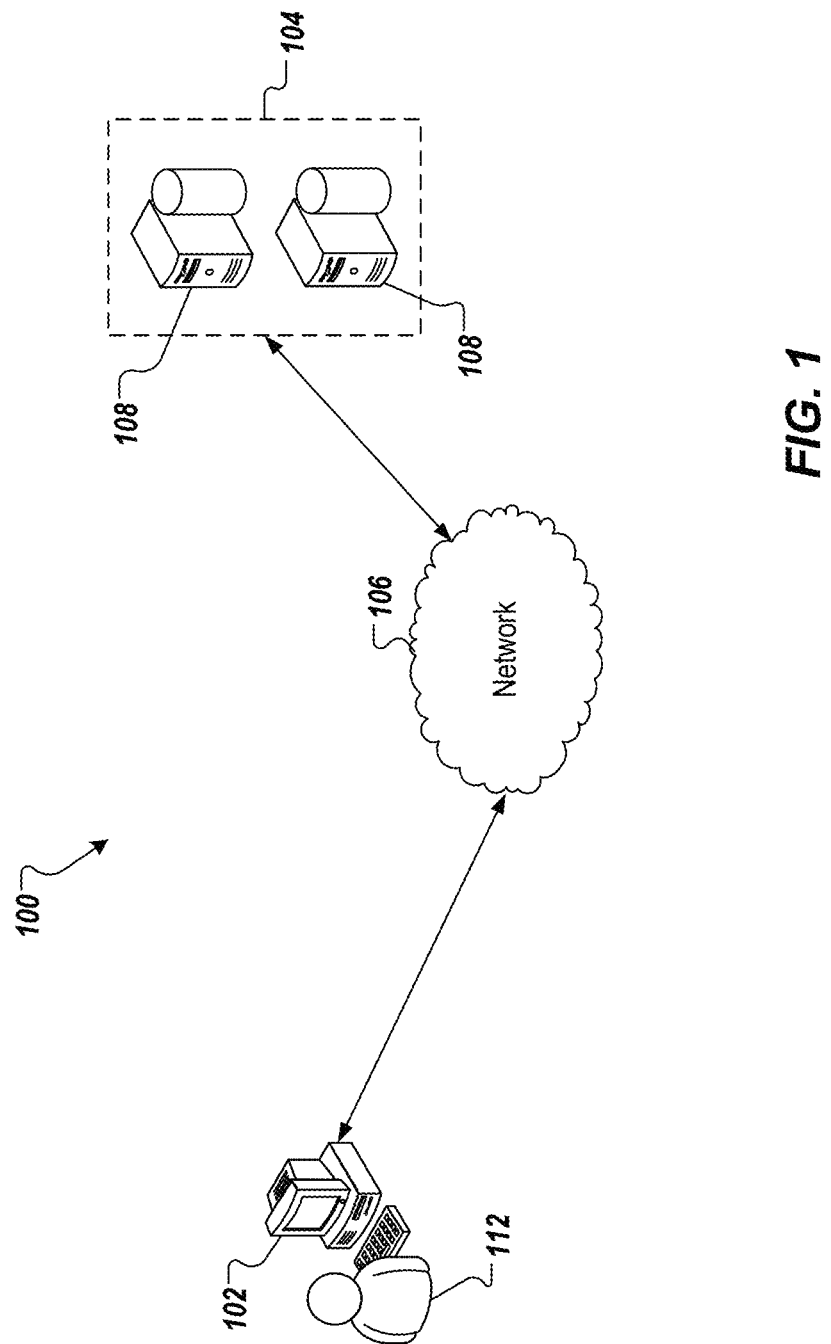
FIG. 1 depicts an example architecture that can be used to execute implementations of the present disclosure.

Implementations of the present disclosure are directed to a digital assistant system that leverages large language models (LLMs) for the presentation and delivery of explanations in enterprise systems including graphical representations of data. More particularly, implementations of the present disclosure are directed to a digital assistant system that enables LLM-generated text to be generated based on enterprise data and presented to users within graphical user interface (GUIs) within digital assistants. In this manner, user-friendly and intuitive explanations of the data can be provided in hand with graphical representations of the data.

Implementations can include actions of receiving a query from a digital assistant of an enterprise system, retrieving data that is responsive to the query from a data management system, inputting a first few-shot prompt to a LLM, and determining, in response to the first few-shot prompt, that a graphical representation of the data is to be generated, and in response: inputting a second few-shot prompt and a third few-shot prompt to the LLM, receiving code from the LLM responsive to the third few-shot prompt, and executing the code to render the graphical representation with the digital assistant.

To provide context for implementations of the present disclosure, and as introduced above, enterprises continuously seek to improve and gain efficiencies in their operations. To this end, enterprises employ software systems to support execution of operations. Recently, enterprises have embarked on the journey of so-called intelligent enterprise, which includes automating tasks executed in support of enterprise operations using ML systems. For example, one or more ML models are each trained to perform some task based on training data. Trained ML models are deployed, each receiving input (e.g., a computer-readable document) and providing output (e.g., classification of the computer-readable document) in execution of a task (e.g., document classification task). For example, ML systems can be used for data analytics to process data representative of enterprise operations and present insights to users.

In enterprise systems, data representative of enterprise operations and/or actions, and the like needs to be communicated to users in a manner that is not only easy to understand and user-friendly, but time- and resource-efficient. To this end, GUIs can be used to graphically represent data. For data science and ML solutions, the importance of accurate and efficient conveyance of data is compounded, because the data and information generated from ML systems are mathematical and technical. As such, the data is already difficult to understand and is not readily presentable in a user-friendly manner.

In the field of artificial intelligence (AI), LLMs have gained increasing popularity. For example, LLMs can be used to generate user-friendly, textual explanations across a variety of topics, which can be presented in digital assistants (e.g., chatbots). However, functionality of LLMs is limited. For example, LLMs are not able to generate graphical representations of data (e.g., graphs, plots, charts) in the context of digital assistants.

In view of the above context, implementations of the present disclosure provide a digital assistant system that leverages LLMs for the presentation and delivery of explanations in enterprise systems including graphical representations of data. As described in further detail herein, the digital assistant system of the present disclosure enables LLM-generated text to be integrated and presented in GUIs within a digital assistant to provide intuitive and user-friendly explanations for users.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host a digital assistant system that leverages one or more LLMs to generate text that is integrated and presented in GUIs with a digital assistant to provide intuitive and user-friendly explanations for users.

As described in further detail herein, the digital assistant system of the present disclosure provides an integrated UI rendering solution within a digital assistant that leverages a LLM to generate explanatory text in view of and that is consistent with data that is displayed as a graphical representation (e.g., chart, graph). More particularly, the digital assistant system of the present disclosure leverages the ability of the LLM to generate code and an understanding of the data to automatically create a UI solution based on a user question and context.

With non-limiting reference to an example use case, a ML system can train multiple ML models based on historical data (training data). For example, and without limitation, a ML model can be tasked with matching entities between multiple computer-readable documents (e.g., line-item matching). Each of the multiple ML models has its own metrics indicating respective performance of the ML model (e.g., accuracy, precision, recall). A user may want to understand which ML model is better in performance and why. To evaluate this, the user can query a metrics comparison of ML models, the metrics comparison being represented in data. The user query can be input to a digital assistant and can include a query requesting a comparison of ML models. In response to the query, the digital assistant system of the present disclosure receives text and UI code that are generated by a LLM. The UI code is executed to render a graphical representation of the data and the text is displayed, which provides a textual explanation for the data.

Figure 2:
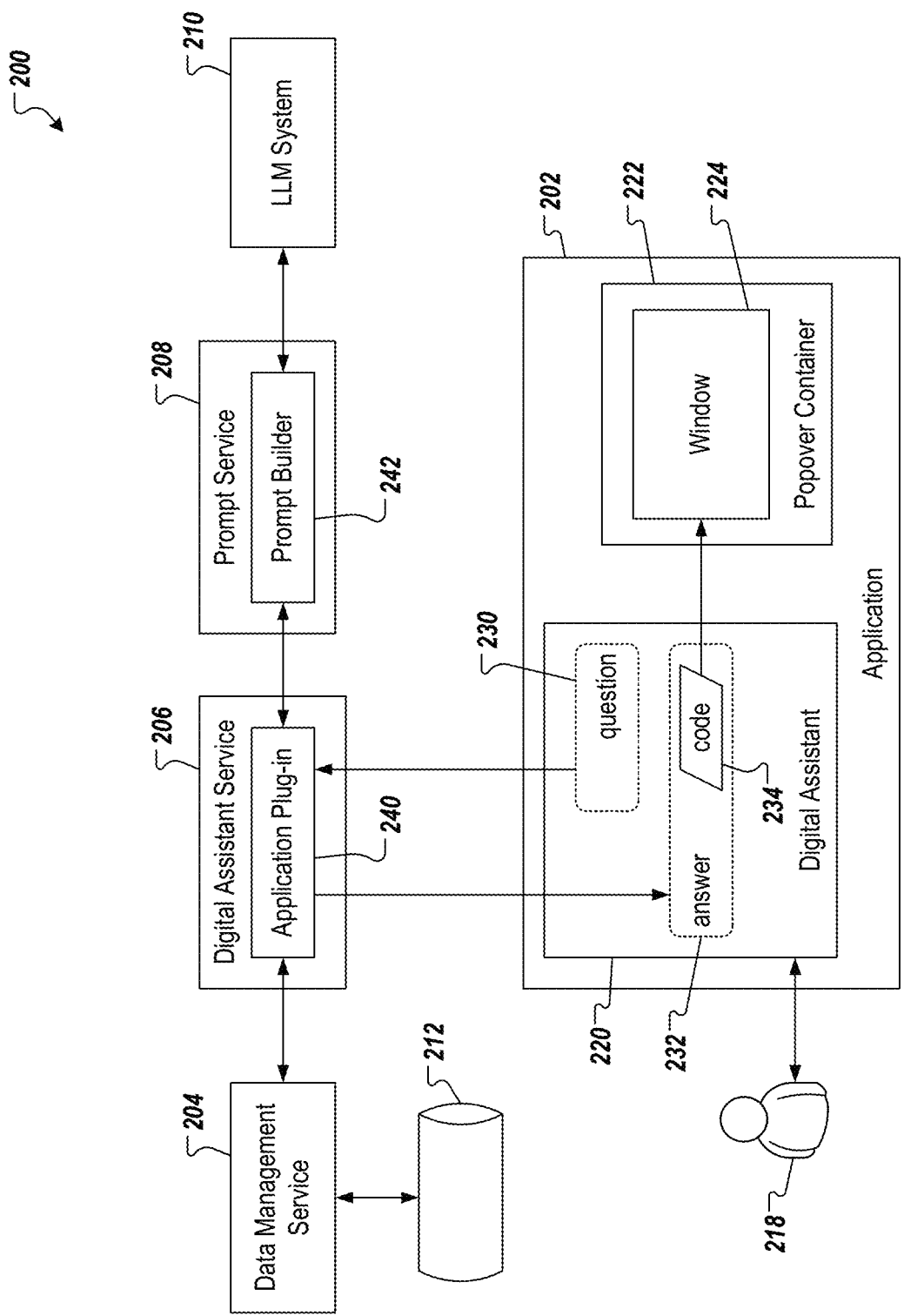
FIG. 2 depicts an example conceptual architecture in accordance with implementations of the present disclosure.

FIG. 2 depicts an example conceptual architecture 200 in accordance with implementations of the present disclosure. In the depicted example, the conceptual architecture 200 includes an application 202, a data management service 204, a digital assistant service 206, a prompt service 208, an LLM system 210, and a datastore 212. In some examples, one or more of the application 202, the data management service 204, the digital assistant service 206, the prompt service 208, the LLM system 210, and the datastore 212 are hosted in a cloud-based environment (e.g., the server system 104 of FIG. 1). In some examples, the application 202 executes functionality to support interactions with a user 218, which can include, but are not limited to conveying data to the user 218.

In accordance with implementations of the present disclosure, the application 202 includes a digital assistant 220 that enables interactions with the user 218. For example, and as described in further detail herein, the user 218 can query the digital assistant 220 to receive query responses from the digital assistant. In some examples, one or more query responses can include data that is presented as a graphical representation in a GUI. In accordance with implementations of the present disclosure, the digital assistant 220 can present data as a graphical representation in a popover container 222 within a window 224 therein. In some examples, the popover container 222 is provided as an iframe-based container and the digital assistant 220 communicates with the popover container 222 using remote procedure calls (RPCs).

As described in further detail herein, the user 218 can input a query 230 to the digital assistant 220 and the digital assistant 220 can receive a response 232 to the query 230. In accordance with implementations of the present disclosure, the response 232 can include a textual explanation and code 234. In some examples, the textual explanation includes text that is generated by a LLM in view of the code 234 and is displayed in a UI of the digital assistant. In some examples, a graphical representation is generated by execution of the code 234 and is depicted in the window 224 of the popover container 222. In some examples, the graphical representation can be provided as a web-based rendering using a web rendering runtime that is built into the popover container 222 (e.g., iframe). In some examples, the graphical representation is compatible with a UI framework of the popover container 222. An example UI framework includes, without limitation, SAPUI5 provided by SAP SE of Walldorf, Germany.

In further detail, in response to the query 230, the digital assistant sends a request to the digital assistant service 206. In the example of FIG. 2, the digital assistant service 206 includes an application plug-in 240 that enables communication between the digital assistant 220 and other components of the conceptual architecture 200, as described herein.

In some examples, the application plug-in 240 functions as an endpoint of the digital assistant service 206 for the (specific) application 202. For example, from the digital assistant 220 (e.g., provided as a client) in the application 202, the query 230 is sent to the application plug-in 240 (specific to an application 202). In the application plug-in 240, the connections for the application 202 to the data management service 204 is integrated. In some examples, in response to the query 230, the digital assistant service 206 requests data that is relevant to the query from the data management service 204. The data management service 204 retrieves the data from the datastore 212 and provides the data to the digital assistant service 206. In some examples, the data management service 204 is generic. That is, the data management service 204 is not specific to the application 202. This ensures that any data sources that the application 202 might query are centrally managed.

For example, and with continued reference to the non-limiting example use case, the datastore 212 can store metrics associated with ML models, example metrics including a set of accuracy values and, for each accuracy value a number of matches not proposed, a number of matches incorrectly proposed, and a number of matches correctly proposed). In some examples, the request from the digital assistant service 206 to the data management service 204 includes an identifier that uniquely identifies the ML model, for which metrics are requested, and the data management service 204 retrieves the metrics for the particular ML model from the datastore 212. The metrics can be returned to the digital assistant service 206.

In some examples, the digital assistant service 206 provides text of the query 230 and the data (e.g., the metrics) as input to the prompt service 208, which generates a first few-shot prompt using a prompt builder 242. In accordance with implementations of the present disclosure, the first few-shot prompt provides context for a request for the LLM to perform a task. Here, providing context in a few-shot prompt can be referred to as few-shot learning. In natural language processing (NLP), few-shot learning (also referred to as in-context learning and/or few-shot prompting) is a prompting technique that enables a LLM to process examples before attempting a task. In the context of the present disclosure, the task includes providing explanatory text and, in some instances, UI code.

In some examples, the first few-shot prompt is generated using a prompt template. An example prompt template is provided as:

context=f"""
Given the below query question:
{"user_query_question"}
"""
user_prompt=f"""
is this question asking about benchmark of the model?
Respond by "yes" or "no".
"""
prompt=[{"role": "system", "content": context}, {"role": "user", "content": user_prompt}]
response=get_completion (prompt)

Listing 1: Example Prompt Template

In the example of Listing 1, {"user_query_question"} is variable containing "what is the benchmark of this model?" query from the user (e.g., the query 230). In some examples, the task is to determine whether data associated with the query 230, if any, can be graphically represented. The first few-shot prompt is provided to the LLM system 210, which returns a response that is provided back to the application plug-in 240.

In further detail, the LLM executed by the LLM system 210 processes the first few-shot prompt and determines whether the query is related to data that can be graphically represented in a GUI. For example, and with reference to the non-limiting example use case introduced above, the query 230 can be "What is the benchmark of this model?" with reference to a ML model that matches entities (e.g., bank statement line-items to invoices). In response, it can be determined that the query 230 relates to data (e.g., metrics) that can be graphically represented. In some implementations, if the response returned from the first few-shot prompt is no, a second few-shot prompt is generated and input to the LLM system 210. In some implementations, if the response returned from the first few-shot prompt is yes, a second few-shot prompt and a third few-shot prompt are generated and input to the LLM system 210.

In some implementations, the LLM generates explanatory text responsive to the second few-shot prompt, and the explanatory text is returned as a LLM response. In some examples, the second few-shot prompt includes the query 230. The explanatory text is returned to the digital assistant 220. In some examples, the first few-shot prompt is generated using a prompt template. An example prompt template is provided as:

context=f"""
Given the benchmark data as below:
{"active_model_benchmark_data"}
"""
user_prompt=f"""

what is the benchmark of this model?
"""
prompt=[{"role": "system", "content": context}, {"role": "user", "content": user_prompt}]
response=get_completion (prompt)

Listing 2: Example Prompt Template

In some examples, a third few-shot prompt is generated and input to the LLM system 210 to perform a task. In some examples, the task includes generating UI code that can be executed to render a graphical representation of the data. For example, if the response to the first few-shot prompt is yes, the application plug-in 240 retrieves metric data for the particular ML model from the data management service 204, which is provided to the prompt service 208 to generate a third few-shot prompt. In some examples, the metrics can be provided as:

{
  {"company_code": "ALL",
  "active_correctly_proposed": 796,
  "active_incorrectly_proposed": 32,
  "active_not_proposed": 191,
  "selected_correctly_proposed": 808,
  "selected_incorrectly_proposed": 32,
  "selected_not_proposed": 179,
  "performance_gain": 1.177625122669279}
}

Listing 3: Example Metrics

In some examples, the third few-shot prompt is generated using a prompt template. An example prompt template is provided as:
context=f"""
Given the benchmark data as below:
{"active_model_benchmark_data"}
"""
user_prompt=f"""
create UI5 chart variable by javascript which "Dimension"
is by text "Company Code" and binding "company_code", and
"Measure" by text "Performance Gain" and binding "performance_gain", data path in bound to "company_code_breakdown"
"""
prompt=[{"role": "system", "content": context}, {"role"; "user", "content": user_prompt}]
response=get_completion (prompt)

Listing 4: Example Few-Shot Prompt Template

In some examples, the LLM system 210 returns a response to the third few-shot template, which includes UI code that is provided to the digital assistant 220. Example UI code is provided as:

```
``` javascript
// Create a new chart
var oChart = new sap.viz.ui5.controls.Vizframe({
    width: "100%",
    height: "400px",
    vizType: "column"
});
// Create a dataset and bind it to the chart
var oDataset = new sap.viz.ui5.data.FlattenedDataset({
```

-continued

```
dimensions: [{
    name: "Company Code",
    value: "{company_code}"
}],
measures: [{
    name: "Performance Gain",
    value: "{performance_gain}"
}],
data: {
    path: "/ company_code_breakdown"
}
})
oChart.setDataset(oDataset):
// Add a feed for the dimension
var oFeedDimension = new sap.viz.ui5.controls.common.feeds.Feeditem({
    uid: "categoryAxis",
    type: "Dimension",
    values: ["Company Code"]
});
oChart.addFeed(oFeedDimension);
// Add a feed for the measure
var oFeedMeasure = new sap.viz.uiS.controls.common.feeds.Feeditem({
    uid: "valueAxis",
    type: "Measure",
    values: ["Performance Gain"]
});
oChart.addFeed(oFeedMeasure);
```

Listing 5: Example UI Code

In some implementations, the explanatory text is provided to the digital assistant 220, which displays the textual explanation. In some examples, if the LLM response includes the code 234, the digital assistant 220 triggers opening of the popover container 222 with window 224 to execute the code 234 (UI code) and display the graphical representation of the data.

Figure 3:
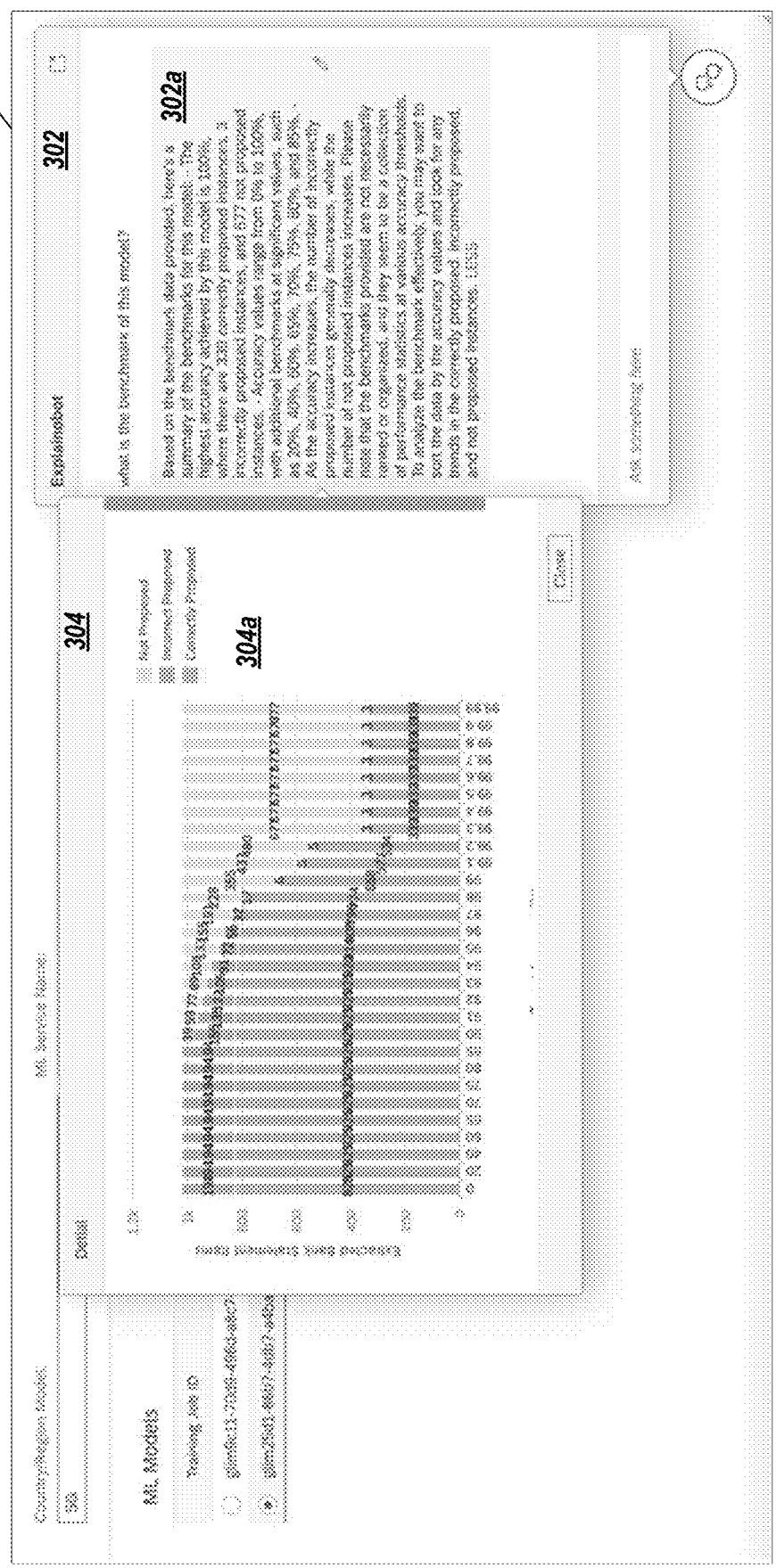
FIG. 3 depicts an example user interface in accordance with implementations of the present disclosure.

FIG. 3 depicts an example UI 300 in accordance with implementations of the present disclosure. The example of FIG. 3 includes a digital assistant 302 (e.g., UI of a digital assistant) and a popover container 304. In the example of FIG. 3, an example query is provided as "What is the benchmark of this model?" input by a user to the digital assistant 302. The LLM response includes explanatory text 302a displayed in the digital assistant 302 and a graphical representation 304a displayed in the popover container 304.

Figure 4:
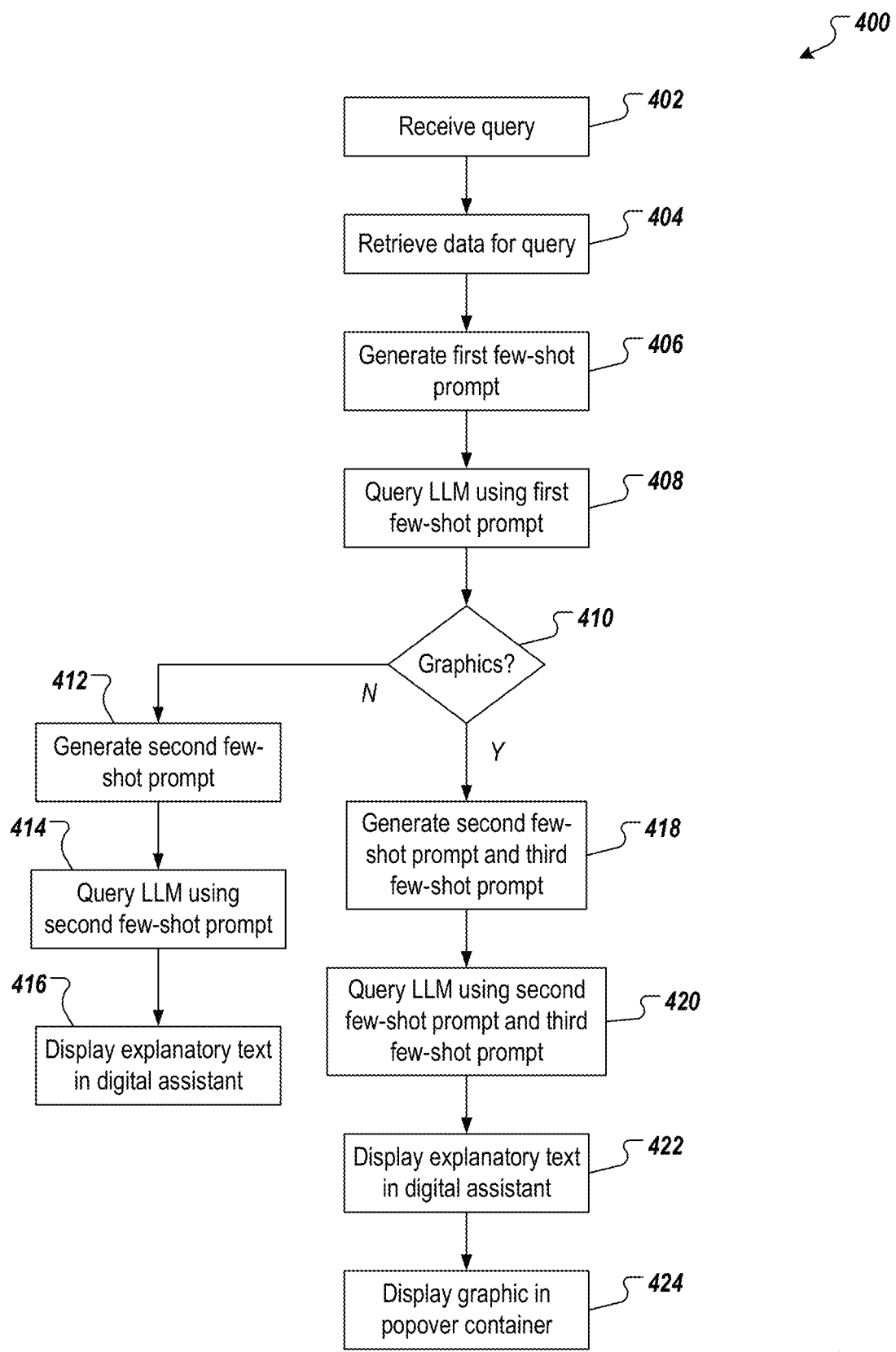
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices.

A query is received (402). For example, and as described herein, the user 218 can input the query 230 into the digital assistant 220. Data for the query is retrieved (404). For example, and as described herein, in response to the query 230, the digital assistant service 206 requests and receives data responsive to the query 230 from the data management service 204. A first few-shot prompt is generated (406) and a LLM is queried using the first few-shot prompt (408). For example, and as described herein, the prompt service 208 generates a first few-shot prompt based on the data and the first few-shot prompt is input to the LLM system 210.

It is determined whether a graphical representation of the data is to be displayed (410). For example, and as described herein, a LLM executed by the LLM system 210 provides a prediction indicating whether the data is capable of being represented in a graphical representation. If a graphical representation of the data is not to be displayed, a second few-shot prompt is generated (412) and is used to query the LLM (414). For example, and as described herein, the prompt service 208 generates a second few-shot prompt to request that the LLM provide explanatory text and the second few-shot prompt is input to the LLM system 210, which provides explanatory text. Explanatory text is displayed in the digital assistant (416). For example, and as described herein, explanatory text is displayed in the digital assistant 220.

If a graphical representation of the data is to be displayed, a second few-shot prompt and a third few-shot prompt are generated (418) and are used to query the LLM (420). For example, and as described herein, the prompt service 208 generates a second few-shot prompt to request that the LLM provide explanatory text and the second few-shot prompt is input to the LLM system 210, which provides explanatory text. As another example, and as described herein, the prompt service 208 generates a third few-shot prompt to request that the LLM provide UI code and the third few-shot prompt is input to the LLM system 210, which provides UI code. Explanatory text is displayed in the digital assistant (422) and the graphical representation is displayed in the popover container (424). For example, and as described herein, explanatory text is displayed in the digital assistant 220 and the popover container 222 is created and the code 234 is executed to display a graphical representation of the data within the popover container 222.

Figure 5:
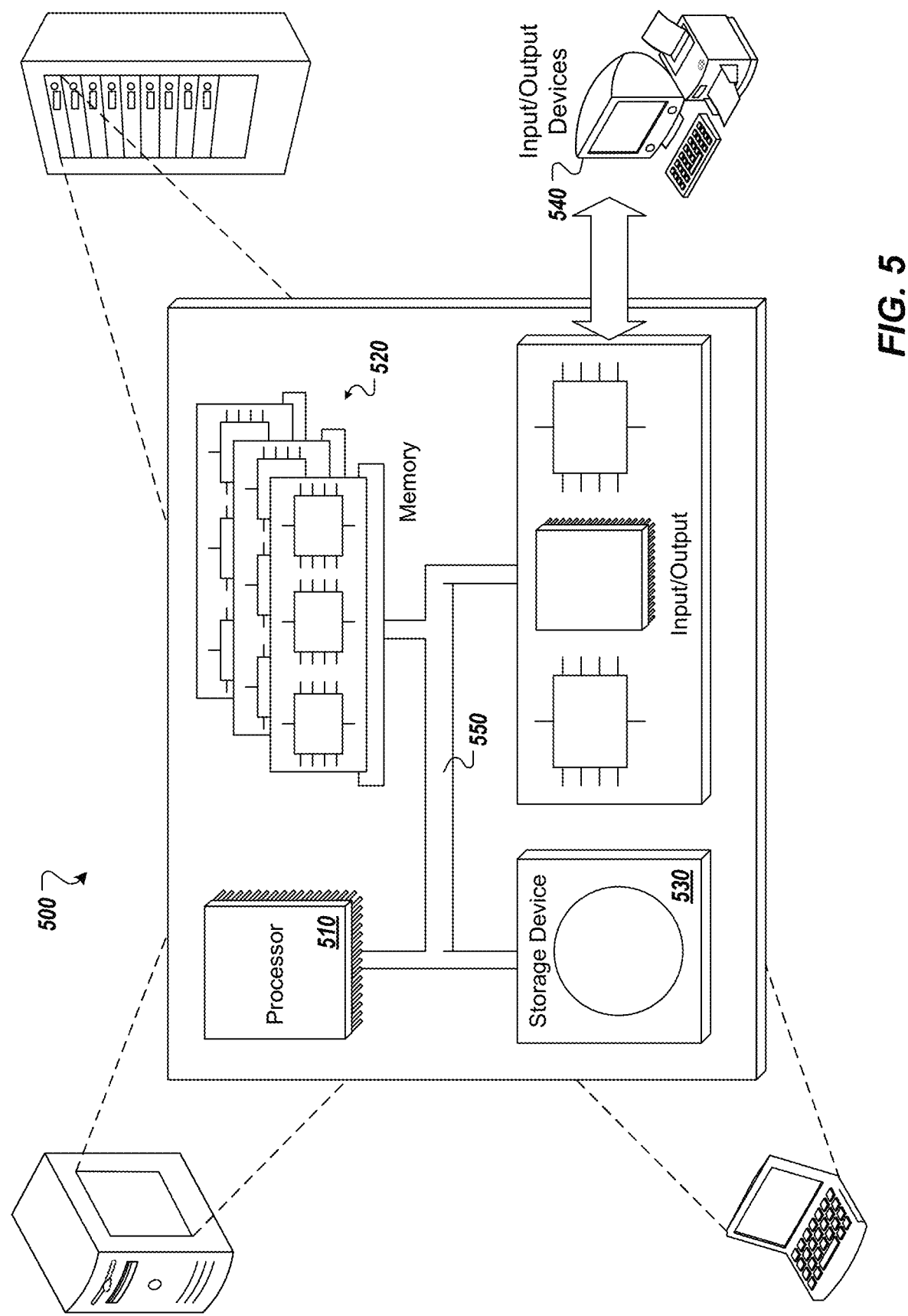
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for selectively generating graphical representations with digital assistants in enterprise systems, the method being executed by one or more processors and comprising:
   receiving a query from a digital assistant of an enterprise system;
   retrieving data that is responsive to the query from a data management service;
   inputting a first few-shot prompt to a LLM, the first few-shot prompt being generated using a first prompt template; and
   determining, in response to the first few-shot prompt, that a graphical representation of the data is to be generated, and in response:
      inputting a second few-shot prompt and a third few-shot prompt to the LLM, the second few-shot prompt being generated using a second prompt template that is different from the first prompt template and the third few-shot prompt being generated using a third prompt template that is different from the second prompt template,
      receiving code from the LLM responsive to the third few-shot prompt, and
      executing the code to render the graphical representation with the digital assistant.

2. The method of claim 1, wherein the graphical representation is rendered within a popover container.

3. The method of claim 2, wherein the digital assistant communicates with the popover container using remote procedure calls (RPCs) to execute the code and render the graphical representation.

4. The method of claim 1, further comprising displaying explanatory text within the digital assistant, the explanatory text being provided from the LLM in response to the second few-shot prompt and providing an explanation for the data and is responsive to the query.

5. The method of claim 1, wherein determining, in response to the first few-shot prompt, that a graphical representation of the data is to be generated comprises generating a response by the LLM responsive to the first few-shot prompt, the response indicating that a graphical representation of the data is to be generated.

6. The method of claim 1, wherein the digital assistant is provided in an application.

7. The method of claim 1, wherein the data management service is agnostic to multiple applications executing digital assistants.

8. A non-transitory computer-readable storage medium coupled to one or more processors and having instructions stored thereon which, when executed by the one or more processors, cause the one or more processors to perform operations for selectively generating graphical representations with digital assistants in enterprise systems, the operations comprising:
   receiving a query from a digital assistant of an enterprise system;
   retrieving data that is responsive to the query from a data management service;
   inputting a first few-shot prompt to a LLM, the first few-shot prompt being generated using a first prompt template; and
   determining, in response to the first few-shot prompt, that a graphical representation of the data is to be generated, and in response:
      inputting a second few-shot prompt and a third few-shot prompt to the LLM, the second few-shot prompt being generated using a second prompt template that is different from the first prompt template and the third few-shot prompt being generated using a third prompt template that is different from the second prompt template,
      receiving code from the LLM responsive to the third few-shot prompt, and
      executing the code to render the graphical representation with the digital assistant.

9. The non-transitory computer-readable storage medium of claim 8, wherein the graphical representation is rendered within a popover container.

10. The non-transitory computer-readable storage medium of claim 9, wherein the digital assistant communicates with the popover container using remote procedure calls (RPCs) to execute the code and render the graphical representation.

11. The non-transitory computer-readable storage medium of claim 8, wherein operations further comprise displaying explanatory text within the digital assistant, the explanatory text being provided from the LLM in response to the second few-shot prompt and providing an explanation for the data and is responsive to the query.

12. The non-transitory computer-readable storage medium of claim 8, wherein determining, in response to the first few-shot prompt, that a graphical representation of the data is to be generated comprises generating a response by the LLM responsive to the first few-shot prompt, the response indicating that a graphical representation of the data is to be generated.

13. The non-transitory computer-readable storage medium of claim 8, wherein the digital assistant is provided in an application.

14. The non-transitory computer-readable storage medium of claim 8, wherein the data management service is agnostic to multiple applications executing digital assistants.

15. A system, comprising:
   a computing device; and
   a computer-readable storage device coupled to the computing device and having instructions stored thereon which, when executed by the computing device, cause the computing device to perform operations for selectively generating graphical representations with digital assistants in enterprise systems, the operations comprising:
      receiving a query from a digital assistant of an enterprise system;
      retrieving data that is responsive to the query from a data management service;
      inputting a first few-shot prompt to a LLM, the first few-shot prompt being generated using a first prompt template; and
      determining, in response to the first few-shot prompt, that a graphical representation of the data is to be generated, and in response:
         inputting a second few-shot prompt and a third few-shot prompt to the LLM, the second few-shot prompt being generated using a second prompt template that is different from the first prompt template and the third few-shot prompt being generated using a third prompt template that is different from the second prompt template, receiving code from the LLM responsive to the third few-shot prompt, and executing the code to render the graphical representation with the digital assistant.

16. The system of claim 15, wherein the graphical representation is rendered within a popover container.

17. The system of claim 16, wherein the digital assistant communicates with the popover container using remote procedure calls (RPCs) to execute the code and render the graphical representation.

18. The system of claim 15, wherein operations further comprise displaying explanatory text within the digital assistant, the explanatory text being provided from the LLM in response to the second few-shot prompt and providing an explanation for the data and is responsive to the query.

19. The system of claim 15, wherein determining, in response to the first few-shot prompt, that a graphical representation of the data is to be generated comprises generating a response by the LLM responsive to the first few-shot prompt, the response indicating that a graphical representation of the data is to be generated.

20. The system of claim 15, wherein the digital assistant is provided in an application.

\* \* \* \* \*